United States Patent [19]

Justice

[11] 3,849,726

[45] Nov. 19, 1974

[54] UNIVERSAL PROGRAMMABLE DIGITAL TESTING INTERFACE LINE

[75] Inventor: Frank K. Justice, Clearwater, Fla.

[73] Assignee: Sperry Rand Corporation, New York, N.Y.

[22] Filed: Jan. 28, 1974

[21] Appl. No.: 437,119

[52] U.S. Cl. ............................................. 324/73 R
[51] Int. Cl. ........................................... G01r 31/00
[58] Field of Search ................ 324/73 R; 340/172.5; 235/151.31, 153 AC

[56]         References Cited
         UNITED STATES PATENTS

| | | | |
|---|---|---|---|
| 3,528,006 | 9/1970 | Davis et al. | 324/73 R |
| 3,577,073 | 5/1971 | Cray et al. | 324/73 R |
| 3,581,198 | 5/1971 | Shoemaker et al. | 324/73 |
| 3,599,098 | 8/1971 | McPhail | 324/73 R X |
| 3,602,809 | 8/1971 | Tarvi et al. | 324/73 R X |
| 3,681,682 | 8/1972 | Cox et al. | 324/73 R |
| 3,739,349 | 6/1973 | Burdette et al. | 340/172.5 |
| 3,764,995 | 10/1973 | Helf et al. | 324/73 R X |

*Primary Examiner*—Gareth D. Shaw
*Assistant Examiner*—Mark Edward Nusbaum
*Attorney, Agent, or Firm*—Howard P. Terry; Joseph M. Roehl

[57]          ABSTRACT

A programmable interface line for use with automatic digital test equipment includes a line driver in which first and second output transistors are driven into saturation so as to couple the output line directly to first or second voltage sources respectively in order to provide a stimulus signal representative of the two binary levels. The circuit is programmed to receive response signals by cutting off the output transistors and diverting the response signals to a comparator in which the response signals are compared with reference signals during a specified time interval. A loading circuit includes switches for independently coupling load impedances to a voltage reference so as to evaluate a variety of loading conditions.

7 Claims, 1 Drawing Figure

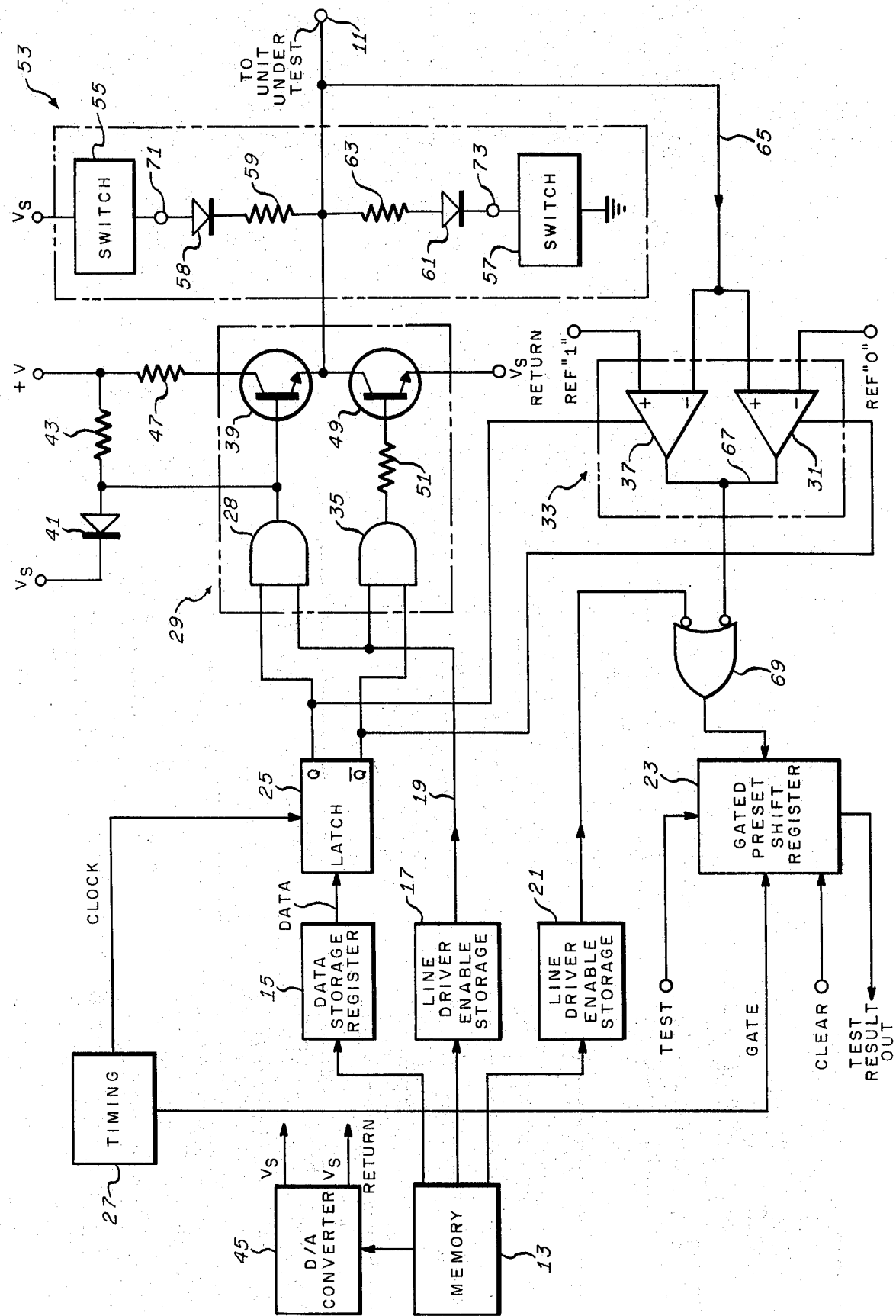

UNIVERSAL PROGRAMMABLE DIGITAL TESTING INTERFACE LINE

BACKGROUND OF THE INVENTION

1. Field of the Invention

The invention pertains to electronic test equipment and more specifically to equipment for testing digital electronic apparatus.

2. Description of the Prior Art

Many prior art digital testing circuits are characterized in that a particular interface line may be used only as an input to the unit under test or only as a detector of output signals from the unit under test. Furthermore, many prior art digital testing circuits are limited in that the drive voltage and detection threshold voltages are preset by hardware and may even be uncertain over a fairly wide range of values.

These shortcomings have been overcome in the digital interface unit described in U.S. Pat. No. 3,739,349 issued to William M. Burdette and David C. Davis on June 12, 1973 and assigned to the present assignee.

The interface circuit of the present invention not only achieves the advantages of the circuit of U.S. Pat. No. 3,739,349, but also provides a circuit in which the impedance can be programmed to meet specialized testing conditions.

SUMMARY OF THE INVENTION

The circuit of the present invention provides a low driving impedance to either a low or high logic voltage so as to guarantee that the driving voltage applied to a circuit under test is not affected by input impedance. The circuit is also capable of providing a high impedance on the same line when the circuit is adjusted to receive a response signal from the circuit under test. The impedance levels are programmable so as to provide suitable impedance levels at specified time intervals to meet the requirements of specialized tests.

BRIEF DESCRIPTION OF THE DRAWING

The sole FIGURE is a functional block diagram illustrating the principles of operation of the interface line of the invention.

DESCRIPTION OF THE PREFERRED EMBODIMENT

The accompanying FIGURE illustrates a single interface line together with suitable storage and control elements. It will be appreciated that a large number of such interface lines would ordinarily be used in conducting tests on digital equipment. Typically 8 such interface lines would be mounted on a single mounting card to take maximum advantage of physical space and the number of bits in commercially available integrated circuits.

In use, an input/output terminal 11 is used to couple the interface line to the circuit under test. The same terminal may be used to provide stimulus signals to the circuit under test or to receive response signals from that circuit.

All information necessary in conducting a test would ordinarily be stored in an external mass memory 13. Depending upon the test to be conducted, stimuli or expected response information, is entered into a data storage register 15 from the memory in preparation for a test. Typically, the data storage register may be an 8-bit shift register. Each of the 8 bits stored in the register may then represent a logic bit to be applied to the unit under test or a logic bit which may be expected to be returned from the unit under test.

A line driver enable storage device 17 is also loaded from the memory 13 in such a way that a logic ONE will appear on the line driver control line 19 whenever a stimulus signal is to be applied to the unit under test. As presently preferred, the line driver enable storage device may be an 8-bit serial-in, parallel-out shift register in which each stage of the register is connected to a different interface line on the same mounting card. Thus all interface lines on a given card may be controlled by one line driver enable storage device.

A compare enable storage device 21 operates in the same manner as the storage device 17 to control the flow of input signals to a gated preset shift register 23 which serves as a test result storage device.

A latching circuit 25 assumes a binary state in accordance with data applied from the data storage register 15 in response to a clock pulse from a timing circuit 27. The latching circuit 25 provides complemented outputs at its Q and $\overline{Q}$ terminals in response to instructions stored in the memory 13. The Q terminal of the latching circuit 25 is connected to a first AND gate 28 in a line driver circuit 29 and to the enable terminal of a first voltage comparator 31 in a comparator circuit 33. Similarly, the $\overline{Q}$-output terminal of the latching circuit 25 is connected to the input of a second AND gate 35 and the enable terminal of a second voltage comparator 37.

The output of the AND gate 28 is applied to the base terminal of a first output transistor 39.

The base element of the transistor 39 is biased by a network which includes a diode 41 and a pull-up resistor 43. The pull-up resistor 43 is coupled to a suitable source of plus voltage, whereas the diode 41 is connected to a voltage source $V_S$ which may be conveniently derived from a digital-analog converter 45. The magnitude of the voltage $V_S$ is programmed in accordance with the requirements of the particular tests to be conducted. The converter 45 may conveniently be made to operate in accordance with instructions stored in the memory 13.

The collector terminal of the transistor 39 is coupled to the source of plus voltage through the collector resistor 47.

The second AND gate 35 is coupled to the base element of a second transistor 49 through a current limiting resistor 51. The emitter element of the transistor 39 is directly coupled to the collector element of the transistor 49 and the emitter element of the transistor 49 is connected to the $V_S$ return of the digital-analog converter 45. The magnitude of the $V_S$ return voltage is determined by the digital-analog converter and may typically assume values from about 0.0 to +0.8 volts.

Stimuli signals are derived from the junction of the emitter and collector elements of the transistors 39 and 49 and applied to the terminal 11.

The interface line further includes a programmable loading circuit 53 which is energized from the $V_S$ voltage from the digital-analog converter 45. The loading circuit may be optionally disconnected from the voltage source $V_S$ by means of a first switch 55 or from ground potential by means of a second independently operated switch 57. The switch 55 is coupled to the input/output terminal 11 through an isolating diode 58 and a loading resistor 59. Similarly, the switch 57 is coupled to the input/output terminal 11 through an isolating diode 61 and a loading resistor 63.

The terminal 11 is coupled to the positive input of the comparator 31 and the negative input of the comparator 37 through a line 65.

The negative input of the comparator 31 is connected to a programmable ZERO reference and the positive input of the comparator 37 is connected to a programmable ONE reference voltage. These reference voltages may conveniently be obtained from a digital-analog converter such as the converter 45.

The output terminals of the comparators 31 and 37 are connected together through a tie line 67 which is coupled to one input of a NOR gate 69.

The comparators are further arranged so that if the comparator 37 is enabled by means of a signal from the Q terminal of the latch 25 and the voltage on the line 65 remains lower than the ONE reference voltage, the comparator output will be a logic ONE. Thus the ONE reference voltage represents a lower limit to an acceptable result. Conversely, if the voltage comparator 31 is enabled by virtue of a voltage at the $\overline{Q}$ terminal of the latching means 25, the ZERO reference voltage represents the upper limit of an acceptable voltage on the interface line.

In summary, if the circuit is programmed to evaluate a logic ONE signal received by the interface line, the received signal must exceed the ONE reference voltage so as to produce a logic ZERO output from the comparator 37 before the received signal will be considered acceptable. If the interface line is programmed to evaluate a logic ZERO signal, the received signal must have a magnitude less than the ZERO reference voltage so as to produce a logic ZERO voltage from the voltage comparator 31 in order to indicate an acceptable signal. In either event, a logic ZERO output from the comparator circuit 33 indicates an acceptable signal.

The NOR gate 69 inverts the output of the comparator 33 and thus produces a logic ONE signal at the input of the gated preset shift register 23.

The gated preset shift register 23 is a commercially available device in which information can be stored at any time during the occurrence of a GATE signal. The information may later be read out on a TEST RESULT OUTPUT line in response to a signal on the TEST line. The register may be later cleared by means of a CLEAR pulse.

The loading circuit 53 is used to set up loading conditions necessary to evaluate the quality of the circuitry in the unit under test. The switches 55 and 57 may conveniently be either transistors or relay contacts and would normally be used in the conducting condition. In most instances, a single pair of switches can be used for all of the interface lines assembled on a given card. With this arrangement, the isolating diodes and the loading resistors coupled to the other interface lines would be connected to the points 71 and 73. When the switches 55 and 57 are used to control the impedance of multiple interface lines, the diodes 58 and 61 serve to isolate one interface line from the others when a switch is open.

The loading resistors 59 and 63 are selected so that when both switches are closed, the interface line voltage assumes a quiescent level between logic ONE and logic ZERO. By proportioning the loading resistors in this way, it is possible to detect failures in pull-up and pull-down devices in the outputs of digital circuits. Since the resistors represent a known load, the quality of the output circuit on the unit under test can be evaluated by selecting a suitable value of reference ONE and references ZERO voltages.

Since either switch may be opened independently, a wide variety of special conditions may be evaluated. Thus closing either one or the other of the switches provides a useful operating mode for testing the quality of high impedance input or output circuits.

When operating in the mode in which both switches are open, the interface line of the present invention may be used to simulate a single-pole, single-throw switch with the input connected to either ground potential or a positive voltage.

When the interface line is to be used in the drive mode wherein a stimulus signal is applied to the unit under test, the line driver enable storage 17 will receive a command from the memory 13 which provides a binary ONE on the line 19 so as to enable the AND circuits 28 and 35 in the line driver 29. At the same time, the digital-analog converter 45 will be programmed to provide suitable $V_S$ and $V_{S\ return}$ signals to the line driver and loading circuits.

Furthermore, the data storage register 15 will have received instructions from the memory 13 regarding the binary signal to be applied to the unit under test. If the data storage register 15 has supplied a logic ONE to the latching circuit 25, a logic ONE will appear at the Q terminal of the latching circuit 25 and a logic ZERO will appear at the $\overline{Q}$ terminal of that circuit in response to a clock pulse from the timing circuit 27. This will cause a logic ONE signal to appear at the output of the AND gate 28 and a logic ZERO signal to appear at the output of the AND gate 35. The voltage output of the gate 28 rises quickly to one diode drop above the programmed level for $V_S$ where it is clamped by the diode 41. The rise time of this voltage is enhanced by the pull-up resistor 43. The output of the AND gate 28 drives the output transistor 39 into conduction. Since the transistor 39 is connected as an emitter follower, the voltage applied to the terminal 11 is approximately the same as the programmed voltage $V_S$.

Conversely, if the memory circuit 13 instructs the interface line to apply a logic ZERO to the unit under test, a logic ONE will appear at the $\overline{Q}$ output terminal of the latching circuit 25 in response to a clock pulse. This will cause a logic ONE to appear at the output of the AND gate 35 whereas a ZERO voltage will appear at the output of the AND gate 28. Under these conditions, the transistor 39 will be turned off and the transistor 49 will be saturated. The voltage applied to the terminal 11 will now be approximately 200 millivolts more positive than the $V_{S\ return}$ voltage by virtue of the drop across the transistor 49.

It can be seen that the magnitude of the input pulses can be adjusted by suitably programming the $V_S$ and $V_{S\ return}$ voltages as well as the loading circuit switches.

When the universal interface line is to be used to evaluate response signals from the unit under test, the memory circuit 13 instructs the line driver enable storage device 17 to apply a logic ZERO voltage to the AND gates 28 and 35 so as to disable these devices. At the same time, the memory 13 instructs the COMPARE ENABLE storage device 21 to apply a logic ONE signal to the NOR gate 69 which allows the signals from the comparator 33 to reach the gated preset shift register 23. The switches 55 and 57 as well as the voltage $V_S$ are also programmed to provide a suitable impedance for the particular test to be conducted and a CLEAR signal is applied to the gated preset shift register 23 in order to prepare this device for the reception of the signals being evaluated.

It will be appreciated that the timing circuit 27 is common to all interface lines in a given test set. The response signal to be evaluated by the particular interface line being described is the result of a stimulus signal applied to the unit under test through a different interface line in response to a block pulse from the timing circuit 27.

Since the gated preset shift register responds only to signals from the NOR gate 69 that occur during the presence of a GATE signal, it is possible to evaluate the propagation time of a signal through the unit under test by delaying the GATE signal for a perdetermined time interval.

Thus the interface line may be used to check propagation delay by providing a GATE pulse of known duration at a programmable point in time after the occurrence of a CLOCK pulse. With this particular test, the response signal to be evaluated will be applied to a programmable impedance determined by the condition of the loading circuit 53 and will be considered acceptable only if the signal has a magnitude within limits imposed by the comparator circuit 33 and occurs within a time "window" determined by the duration of the GATE pulse after a propagation delay established by the programmed delay of the GATE pulse.

Typically, the gated preset shift register 23 may be a multistage device capable of storing a specified number of consecutive test results. Thus, after a given series of tests have been performed, a series of TEST signals may be applied to the register 23 and the stored bits may be evaluated one at a time.

It will be appreciated that although the circuit has been described with respect to discrete elements, commercially available integrated circuits may be used if desired. For instance, a commercially available NAND gate with an open collector output may be used to replace the AND gate 35, the resistor 51 and the transistor 49.

In applications wherein programmable input voltages to the unit under test are considered unnecessary, a further simplification can be realized by replacing the entire line driver circuit as well as the diode 41, the resistors 43 and 47, and the $V_S$ and $V_S$ return generators by one section of a quad two-input logic gate with tri-state output, such as the National Semiconductor Company, DM 8093. In using this particular device, the output enable input of the device would be connected to the line 19 and the signal input would be connected to the output terminals of the latching circuit 25. Under these conditions, whenever a logic ONE appears on the line 19, the gate output will be at the same output level as the Q output terminal of the latching circuit 25, at standard TTL voltages. Whenever, the line 19 is at a low logic level, the gate output is turned off.

Each of the described circuit variations are characterized in that they provide a low drive impedance when on and a high impedance when off. The high off impedance insures that the driver circuitry does not interfere with any voltage levels placed on the interface line by any circuitry in the unit under test.

The extreme flexibility of the universal programmable interface line of the present invention may be programmed to provide a wide variety of tests. For instance, the interface line may be used to simulate a single-pole, single-throw switch with the input connected to either ground or a positive voltage by opening both switches in the loading circuit 53, entering the proper bit into the data storage register 15 and then alternately turning the line driver 29 on and off by means of the information stored in the line drive enable storage device 17.

Similarly, either a faulty pull-up or pull-down device in the output of a unit under test may be detected by properly programming the loading circuit and supply voltages.

Since both driving voltage levels are programmable, input circuitry can be tested at its minimum guaranteed specifications when desired.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. A universal programmable interface line for intercoupling in accordance with stimulus or response information from an external memory, comprising terminal means for connecting the interface line to the external unit, line driver means for producing binary logic stimulus voltages at the terminal means, voltage comparator means for evaluating the magnitude of response signals applied to said terminal means by the external unit, programmable loading means for adjusting the impedance level at the terminal means, means for coupling said line driver means and said loading means to a programmable voltage source, means responsive to said stimulus or response information from said external memory for optionally enabling and disabling said line driver means and said voltage comparator means, and means for temporarily storing information derived from said voltage comparator means, said line driver means including a pair of output transistors arranged to be serially coupled across said programmable voltage source, said transistors being connected so that the emitter element of one transistor and the collector element of the other transistor are directly connected to said terminal means, said line driver means further including means responsive to said enabling means for saturating one or the other of said transistors when a stimulus signal of logic ONE or ZERO, respectively, is to be applied to said external unit.

said loading means including resistor means and switching means for optionally coupling said terminal means to sources of known voltage through said resistor means.

2. The interface line of claim 1 wherein the switching means in said loading means includes first and second switches for optionally connecting said loading means to said programmable voltage source and to ground potential respectively.

3. The interface line of claim 2 wherein the resistor means includes first and second resistors coupled between said terminal means and said first and second switches respectively.

4. The interface line of claim 3 wherein said first and second resistors are selected so that said terminal means assumes a quiescent level intermittant logic ZERO and ONE levels when both switches are closed.

5. The interface line of claim 4 wherein the voltage comparator means includes first and second voltage comparators each having positive and negative input means and output means, said first comparator being arranged to receive at its positive input means a reference signal having a magnitude equal to the minimum acceptable mangitude of an expected logic ONE response signal, said second voltage comparator being arranged to receive at its negative input means, a reference signal having a magnitude equal to the maximum acceptable magnitude of an expected logic ZERO response signal, the remaining input means on both of said voltage comparators being connected directly to the terminal means of said interface line, said first and second voltage comparators further having their output means connected together, said voltage comparator means further containing means to enable only said first voltage comparator when a logic ONE response signal is expected and means to enable only said second voltage comparator when a logic ZERO response signal is expected.

6. The interface line of claim 5 wherein said means for temporarily storing information derived from said voltage comparator means includes a gated preset shift register arranged to accept information from either of said voltage comparators during the occurrence of a GATE pulse.

7. The interface line of claim 6 wherein the means for enabling and disabling the voltage comparator means includes a NOR gate connected to receive logic ONE enabling signals and logic ZERO disabling signals in response to instructions from an external memory, said NOR gate further being coupled to receive output signals from said voltage comparator means and to apply output signals to said gated preset shift register.

* * * * *